US011119780B2

(12) United States Patent
Lesartre

(10) Patent No.: US 11,119,780 B2
(45) Date of Patent: Sep. 14, 2021

(54) SIDE CACHE

(71) Applicant: HEWLETT PACKARD ENTERPRISE DEVELOPMENT LP, Houston, TX (US)

(72) Inventor: Gregg B. Lesartre, Fort Collins, CO (US)

(73) Assignee: Hewlett Packard Enterprise Development LP, Houston, TX (US)

(*) Notice: Subject to any disclaimer, the term of this patent is extended or adjusted under 35 U.S.C. 154(b) by 161 days.

(21) Appl. No.: 15/967,523

(22) Filed: Apr. 30, 2018

(65) Prior Publication Data
US 2019/0332382 A1    Oct. 31, 2019

(51) Int. Cl.
G06F 9/30     (2018.01)
G06F 9/38     (2018.01)

(52) U.S. Cl.
CPC ........ *G06F 9/3802* (2013.01); *G06F 9/30047* (2013.01)

(58) Field of Classification Search
None
See application file for complete search history.

(56) References Cited

U.S. PATENT DOCUMENTS 6,131,143 A * 10/2000 Sakai ................. G06F 12/0864
                                                711/128
6,944,718 B2    9/2005 Jouppi
7,409,500 B2 *  8/2008 Steely, Jr. ........... G06F 9/30043
                                                711/100
8,683,129 B2    3/2014 Ono
8,806,135 B1    8/2014 Ashcraft
2003/0182539 A1* 9/2003 Kunkel ................. G06F 9/383
                                                712/225
2015/0149733 A1  5/2015 Rozas

OTHER PUBLICATIONS

"How Can CPU Designers Prevent Information Leaks From Speculated Execution?" Retrieved from Internet Mar. 7, 2018, 4 pages, <https://security.stackexchange.com/questions/177972/how-can-cpu-designers-prevent-information-leaks-from-speculated-execution>.

(Continued)

*Primary Examiner* — Corey S Faherty
(74) *Attorney, Agent, or Firm* — Sheppard Mullin Richter & Hampton LLP

(57) ABSTRACT

A device including a processor configured to access data to execute multiple instructions and a first cache coupled to the processor, are provided. The first cache is configured to hold a first data fetched from a memory by a first instruction that has been retired. The device also includes a side cache coupled to the first cache and to the processor, the side cache configured to hold a second data fetched from the memory by a second instruction, wherein the second instruction has not been retired from the processor. And the device includes a cache management unit configured to move the second data from the side cache to the first cache when the second instruction is retired, the cache management unit further configured to discard the second data when it is determined that the second instruction is abandoned.

20 Claims, 6 Drawing Sheets

(56) References Cited

OTHER PUBLICATIONS

"What Fails in Speculative Execution That Allows the Read of Memory Out of Bounds in Spectre Vulnerability Vs. Normal CPU Behaviour," Retrieved from Internet Mar. 7, 2018, 11 pages, <https://security.stackexchange.com/questions/176867/what-fails-in-speculative-execution-that-allows-the-read-of-memory-out-of-bounds >.
Y Hacker News, Retrieved from Internet Mar. 7, 2018, 3 pages, <https://news.ycombinator.com/item?id=16066425>.
Kocher et al., "Spectre Attacks: Exploiting Speculative Execution", Cryptography Research Division, Dec. 18, 2019, 20 pages.
Lipp et al., "Meltdown", Cryptography Research Division, Jan. 3, 2018, pp. 1-16.

* cited by examiner

SIDE CACHE

TECHNICAL FIELD

Embodiments described herein are generally related to the field of processor architectures for cache management. More specifically, embodiments described herein are related to hardware solutions to prevent vulnerabilities in the cache management of central processing units for computing devices.

BACKGROUND

To take advantage of high processing capabilities of densely packed logic units in a central processing unit (CPU), current processor architectures are designed to perform out-of-order execution of multiple computational threads or branches. However, it has been recently demonstrated that cache management in current processor architectures may lead to serious vulnerabilities and data breaches from malicious third party applications running in parallel in the processor. The vulnerabilities arise from cache miss events wherein a cache management unit fails to retrieve data for executing a line in the instruction queue, forcing the processor to retrieve the missing data directly from memory, and leaving a detectable mark on the cache. Current solutions to such vulnerability for data exposure include cache randomization techniques handled by software operating directly over the processor control. These software solutions, while potentially more secure, include a high cost in processing performance, as each instruction in the processor is encoded and decoded appropriately during execution.

The description provided in the background section should not be assumed to be prior art merely because it is mentioned in or associated with the background section. The background section may include information that describes one or more aspects of the subject technology.

SUMMARY

In certain aspects, a device as disclosed herein includes a processor configured to access data to execute multiple instructions and a first cache coupled to the processor, the first cache configured to hold a first data fetched from a memory by a first instruction that has been retired. The device also includes a side cache coupled to the first cache and to the processor, the side cache configured to hold a second data fetched from the memory by a second instruction, wherein the second instruction has not been retired from the processor. And the device includes a cache management unit configured to move the second data from the side cache to the first cache when the second instruction is retired, the cache management unit further configured to discard the second data when it is determined that the second instruction is abandoned.

In certain aspects, a system as disclosed herein includes a memory storing computer code, and a central processing unit coupled to the memory. The central processing unit includes a processor configured to execute multiple memory access instructions and a first cache coupled to the processor, the first cache configured to hold a first data copied into the first cache from the memory by a first memory access instruction that has been retired. The central processing unit also includes a side cache coupled to the first cache and to the processor, the side cache configured to hold a second data copied into the side cache from the memory by a second memory access instruction, wherein the second memory access instruction has not been retired from the processor, and a cache management unit configured to move the second data from the side cache to the first cache when the second memory access instruction is retired, the cache management unit further configured to discard the second data when it is determined that the second memory access instruction is abandoned.

In certain aspects, a method includes fetching, by a processor, a first data from a memory for a first instruction to be executed by the processor, and retiring the first instruction from a processing schedule. The method also includes copying the first data in a first cache of the processor, fetching a second data from the memory for a second instruction to be executed by the processor, and copying the second data to a side cache of the processor before the second instruction is retired from the processing schedule. The method also includes transferring, with a cache management unit in the processor, the second data from the side cache to the first cache when the second instruction is retired, and discarding the second data when it is determined that the second instruction is abandoned before an execution by the processor.

In certain aspects, a system is described including a means for storing instructions (e.g., in an instruction buffer or instruction cache, or in a memory). The system further includes a means to execute the instructions to perform a method, the method including fetching, by a processor, a first data from a memory for a first instruction to be executed by the processor, and retiring the first instruction from a processing schedule. The method also includes copying the first data in a first cache of the processor, fetching a second data from the memory for a second instruction to be executed by the processor, and copying the first data to a side cache of the processor before the second instruction is retired from the processing schedule. The method also includes transferring, with a cache management unit in the processor, the second data from the side cache to the first cache when the second instruction is retired, and discarding the second data when it is determined that the second instruction is abandoned before an execution by the processor.

BRIEF DESCRIPTION OF THE DRAWINGS

In the figures, elements and steps denoted by the same or similar reference numerals are associated with the same or similar elements and steps, unless indicated otherwise.

DETAILED DESCRIPTION

Figure 1:
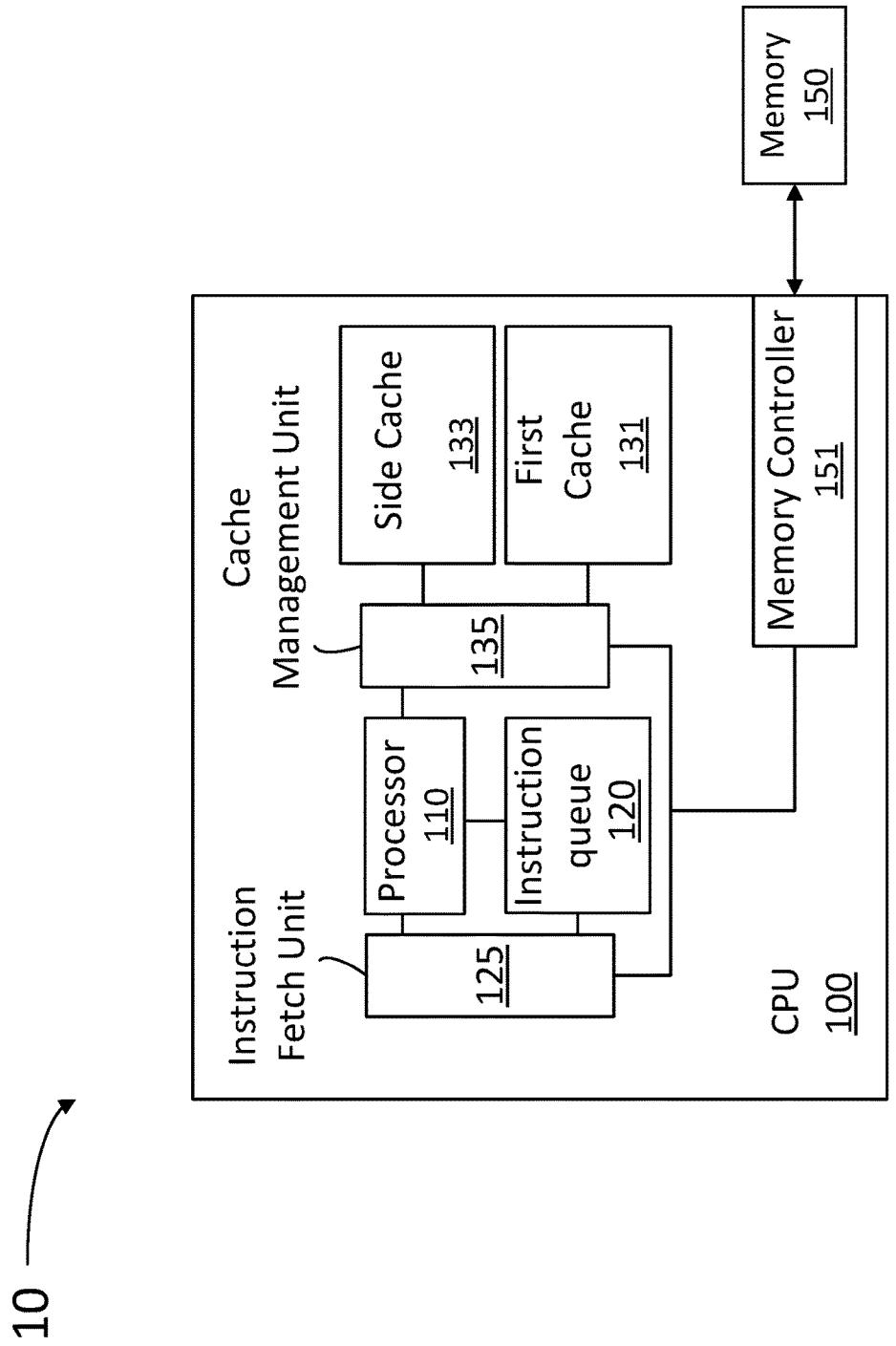
FIG. 1 illustrates a computing device including a central processing unit (CPU) and a memory, according to some embodiments.

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides a solution for high performance processing with substantial reduction of vulnerability to cache attacks from malicious third party applications by including a side cache coordinated with out-of-order execution instructions in the execution pipeline of a CPU. More specifically, embodiments as disclosed herein may be used for preventing processor vulnerabilities (e.g., "Meltdown" and "Spectre," among other attacks based on cache miss events). Embodiments as disclosed herein provide a mechanism to prevent speculative instructions from modifying a cache state, while still allowing the performance benefit of speculative instruction execution (e.g., out-of-order and speculative branch execution).

The disclosed system addresses a technical problem tied to computer technology and arising in the realm of computer operation, namely the technical problem of cache attack vulnerabilities from speculative execution pathways. Further, embodiments as disclosed herein provide a substantial reduction of cache attack vulnerabilities at substantially no cost in processor performance, with reduced impact in hardware re-design of the computer CPU, and real estate usage.

The Meltdown and Spectre processor vulnerabilities exploit cache state that is modified by speculative execution, to breach processor security. Typically, speculative instructions may be discarded before they affect processor state, but after a speculative data access triggers a change of the contents of the processor caches. Accordingly, exploitive code like Meltdown or Spectre cause speculative use of protected data to modify which lines are in the cache. Protected data may then be extracted by examining which cache lines are resident.

Software workarounds have been proposed, but they come at a cost of processor performance. Processor microcode (for processors that use microcode) may be modified to at least lower the exposure to speculative execution hazards, but at a cost of processor performance. A processor may link execution of the component micro-ops that make up complex instructions to avoid executing security functions ahead of data access. This would avoid the Meltdown vulnerability, but not the Spectre vulnerability. A processor may block speculative execution of data accesses that miss in the cache until they are known to not be speculative. This gives up some, but not all, of the performance benefit of speculative execution. Some approaches may avoid the current form of cache vulnerabilities, but requires more bandwidth to the cache to update the cache lines to non-speculative, and may expose a new hazard that keys on cache lines that were in the cache, but are displaced when a cache line is moved in and marked speculative, even if it is eventually invalidated because it is speculative.

Embodiments as disclosed herein prevent speculative instructions from modifying cache state, e.g., by preventing the triggering of cache line evictions. Further, embodiments as disclosed herein maintain the performance benefit of speculative instruction execution without security exposure. Additionally, new variants of the Meltdown and Spectre vulnerabilities are anticipated and addressed in embodiments as disclosed herein.

FIG. 1 illustrates a computer device 10 including a CPU 100 and a memory 150, according to some embodiments. CPU 100 includes a processor 110 configured to access data to execute multiple instructions in an instruction queue 120. In some embodiments, the instructions are fetched into the instruction queue 120 by an instruction fetch unit 125. CPU 100 also includes a first cache 131 coupled to processor 110. Cache 131 is configured to hold a first cache line fetched from memory 150 in response to a first instruction that has been retired from instruction queue 120. In some embodiments, CPU 100 includes a side cache 133 coupled to cache 131 and configured to hold a second data fetched from memory 150 by a second instruction that has not been retired from instruction queue 120.

In some embodiments, a cache management unit 135 controls data access to and from cache 131 and side cache 133. For example, cache management unit 135 may be configured to move the second data from side cache 133 to cache 131 when the second instruction is retired. In some embodiments, cache management unit 135 is further configured to discard the second data when it is determined that the second instruction is abandoned (e.g., removed from instruction queue 120). In some embodiments, cache management unit 135 is configured to identify an access miss to cache 131 by a third instruction, and to provide the second data to processor 110 in response to an execution of the third instruction. In some embodiments, cache management unit 135 is configured to evict a line from cache 131 when the second instruction is scheduled for retirement, thereby making space to move second line from side cache 133 to cache 131. Eviction includes writing data that has been modified in cache 131 to memory 150 and invalidating the cache line. Eviction includes invalidation of an unmodified cache line. In some embodiments, cache management unit 135 is configured to invalidate an entry in side cache 133, wherein the invalidated data cache line is associated with an instruction that was fetched prior to a retiring instruction. In some embodiments, cache management unit 135 is configured to add a timestamp to the second data when the second data is entered in side cache 133, and to provide the second data to a requesting third instruction after a period of time based on the timestamp.

In some embodiments, the first instruction and the second instruction may include a memory access instruction that reads a data portion from, or writes the data portion to, memory 150. Accordingly, the data portion may include the first data or the second data. Moreover, in some embodiments, the first data or the second data may be accessed by a third instruction executed by processor 110, the third instruction listed further down the pipeline in instruction queue 120. The third instruction may attempt to access the second data, so it may miss in first cache 131 (which holds the first data) and hit in side cache 133 which then provides the second data to processor 110 for executing the third instruction.

Memory 150 may include a volatile memory, e.g., dynamic, random-access memory (DRAM), and the like (e.g., disposed in a dual in-line memory module—DIMM). Further, in some embodiments, memory 150 may include nonvolatile memory as well (e.g., Phase Change Memory (PCM), ReRAM, FLASH and the like). A memory controller 151 may be part of CPU 100 and configured to establish communication with, fetch data from, and write data into, memory 150. When there is a cache "miss" (e.g., an instruction in instruction queue 120 calls for data that is missing in cache 131 and in side cache 133), cache management unit 135 instructs memory controller 151 to fetch the missing data from memory 150.

Instructions in instruction queue 120 may include memory access instructions, i.e., an instruction that reads or writes data to memory 150, to cache 131 or to side cache 133 (e.g., "load/store" instructions). In some embodiments, instruction queue 120 may also include arithmetic instructions anteceding or succeeding load/store instructions. Instruction queue 120 may include an execution pipeline with 28 instructions, 64 instructions, or many more (e.g., 1000 or 2000).

Instructions in instruction queue 120 may be speculative or retired, according to the level of certitude that the instruction will be executed by processor 110. For example, a given instruction listed further down in instruction queue 120 may generally start out as a speculative instruction. Execution of speculative instructions may be desirable to improve the processor performance, especially during parallel computation, when there are pieces of a complex sequence of operations that may be performed out of sequence. Some speculative instructions in instruction queue 120 may be discarded when preceding instructions are retired. When the speculative instruction is not discarded before it moves up the list in instruction queue 120, it transitions into a deterministic instruction (e.g., the next instruction to be executed by processor 110 is deterministic). In some embodiments, a speculative instruction becomes deterministic at the point of retirement (or scheduling for retirement).

When cache management unit 135 misses a data access in cache 131 for a speculative instruction (e.g., the associated data is not in cache 131), in certain aspects cache management unit 135 may be able to access the data from side cache 133, thereby avoiding a "cache miss" event, with the consequent call to memory controller 151 to retrieve the missing data from memory 150. Accordingly, whether an instruction requesting the data is speculative or deterministic, the requested data is fetched by cache management unit 135 from either cache 131 or side cache 133, whichever "hits" the access request. Accordingly, cache management unit 135 may be configured to modify a state of either cache 131 or side cache 133 to move in missing data that is not already present (e.g., from memory 150), or to evict data to free space in cache 131.

Figure 2:
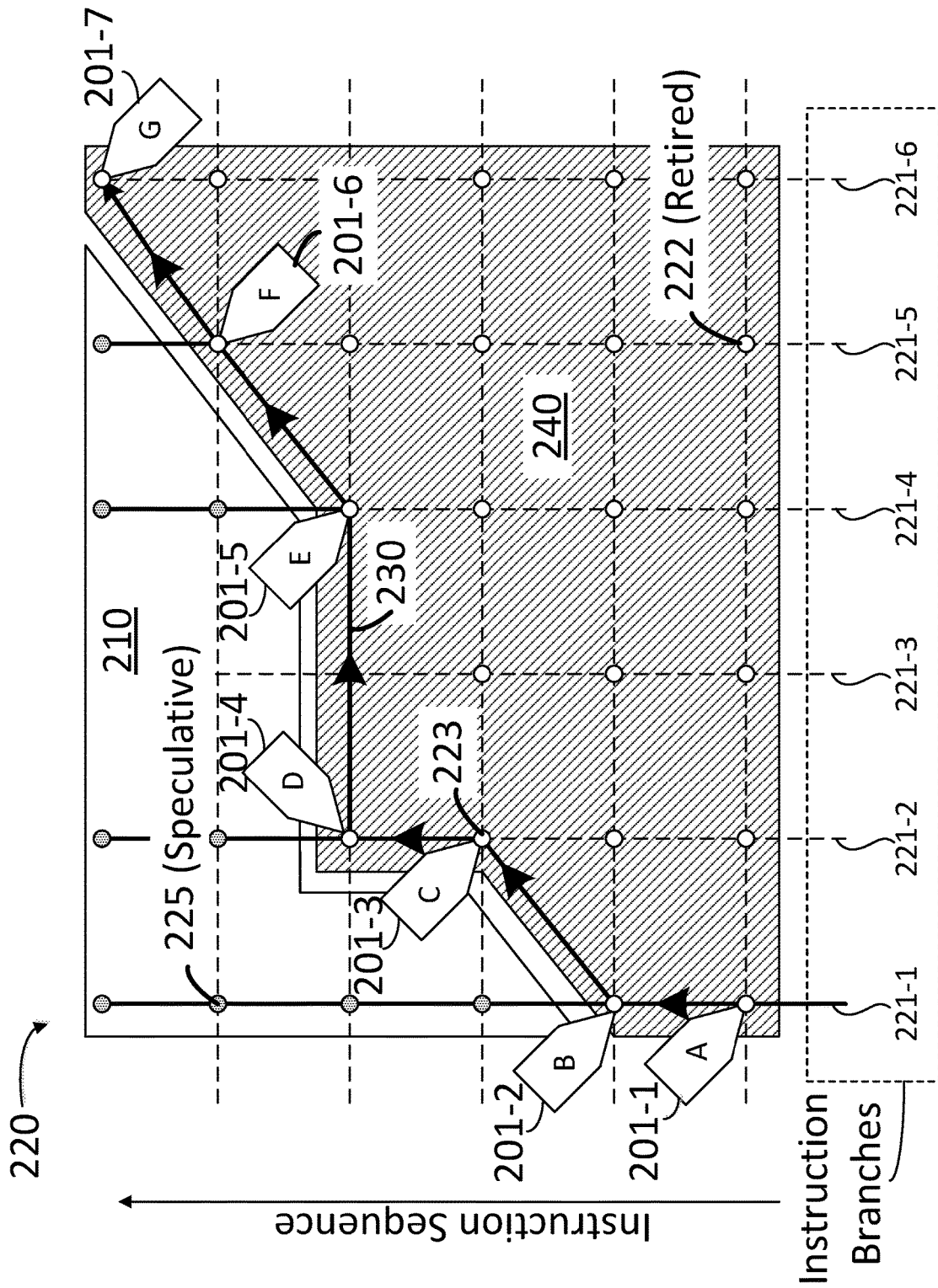
FIG. 2 illustrates an instruction branching in an instruction queue of a central processing unit, including a speculative sector and a valid sector in a processor configured to reduce cache miss vulnerability, according to some embodiments.

In some embodiments, side cache 133 is configured to hold data that was not found in cache 131 until the speculative instruction is retired. FIG. 2 illustrates an instruction branching in an instruction queue 220 of a central processing unit, including a speculative sector 210, a deterministic path 230, and a retired sector 240 for a processor configured to reduce cache miss vulnerability, according to some embodiments. The instructions include multiple instruction branches 221-1, 221-2, 221-3, 221-4, 221-5, and 221-6 (hereinafter, collectively referred to as "instruction branches 221"). Each one of instruction branches 221 may include a sequence of multiple instructions, some of which may be retired instructions 222, others may be deterministic instructions 223 ready to be executed by the processor, and other instructions may be speculative instructions 225.

Instruction branches 221 may be associated with a computing branch being executed (e.g., by processor 110). Accordingly, even when a specific instruction is executed (e.g., for instruction branch 221-3), the branch may be a speculative branch, abandoned at some point later on in favor of deterministic path 230, so that the instructions in speculative sector 210 that belong to speculative instruction branch 221-4 are invalid. Embodiments as disclosed herein include side cache 133 to store data associated with instructions in the speculative sector of instruction branch 221-4 therein. Accordingly, a cache miss or a data eviction is avoided in cache 131 when speculative branch 221-4 is abandoned because the data line fetched by a speculative access is not placed in cache 131.

In some embodiments, instruction fetch unit 125 is configured to associate a tag to each instruction in instruction branches 221 (whether deterministic or speculative). For clarity of illustration, only tags 201-1 (A), 201-2 (B), 201-3 (C), 201-4 (D), 201-5 (E), 201-6 (F), and 201-8 (G) for deterministic instructions 223 are shown. Hereinafter, the above will be collectively referred to as "tags 201" (including tags associated with deterministic or speculative instructions). Furthermore, tags 201 may be such that a lower tag value is associated with an instruction fetched earlier than a second instruction associated with a higher tag value. Further, some tags, e.g., tags 201-2 (B) and 201-3 (C) may be associated with instructions that address the same data cache line in side cache 133. When tags 201 are associated with separate processors, their values may not be sequential between the two processors. In some embodiments each processor maintains its own tag sequence. Accordingly, a full tag assigned in side cache 133 may include a processor managed tag and a "processor identifier." In that regard, tags 201-2 and 201-3 may address the same data line in cache 131 or in side cache 133. Accordingly, in some embodiments tags 201-2 and 201-3 may have different tag bit identifiers, even when they address the same data line in cache 131 or side cache 133. More generally, in some embodiments at least one of instructions 222, 223 and 225 may access one or more cache lines in cache 131 or in side cache 133.

Tags 201 are provided to the cache management unit 135 with the instruction that requested the data at the time of the data request. Tags 201 indicate an instruction sequence number assigned to the instruction when the instruction was fetched by instruction fetch unit 125. In some embodiments, tags 201 are incremented each time a new instruction that accesses data is fetched by instruction fetch unit 125. The assigned tag value continues to increment regardless of whether some of the previously fetched instructions are subsequently discarded because they were down an abandoned speculative branch (e.g., speculative branch 221-3). In some embodiments, tags 201 are added to a data line in side cache 133 along with the data fetched from memory 150. Upon retirement of the instructions that had missed in the cache (when the instruction is known to no longer be speculative), processor 110 provides tag 201-3 back to cache management unit 135. The associated data line in side cache 133 matching tag 201-3 may now be scheduled for inclusion into cache 131. In some embodiments, it may be necessary to evict a data line in cache 131 to make room for copying the data line from side cache 133. At the same time, data lines in side cache 133 with tags less than the just retired instruction are invalidated. The retirement of an instruction with a higher value tag may be indicative that speculative instructions with lower tags have been abandoned because tags 201 are assigned in the order that the associated instructions were fetched by processor 110.

Figure 3:
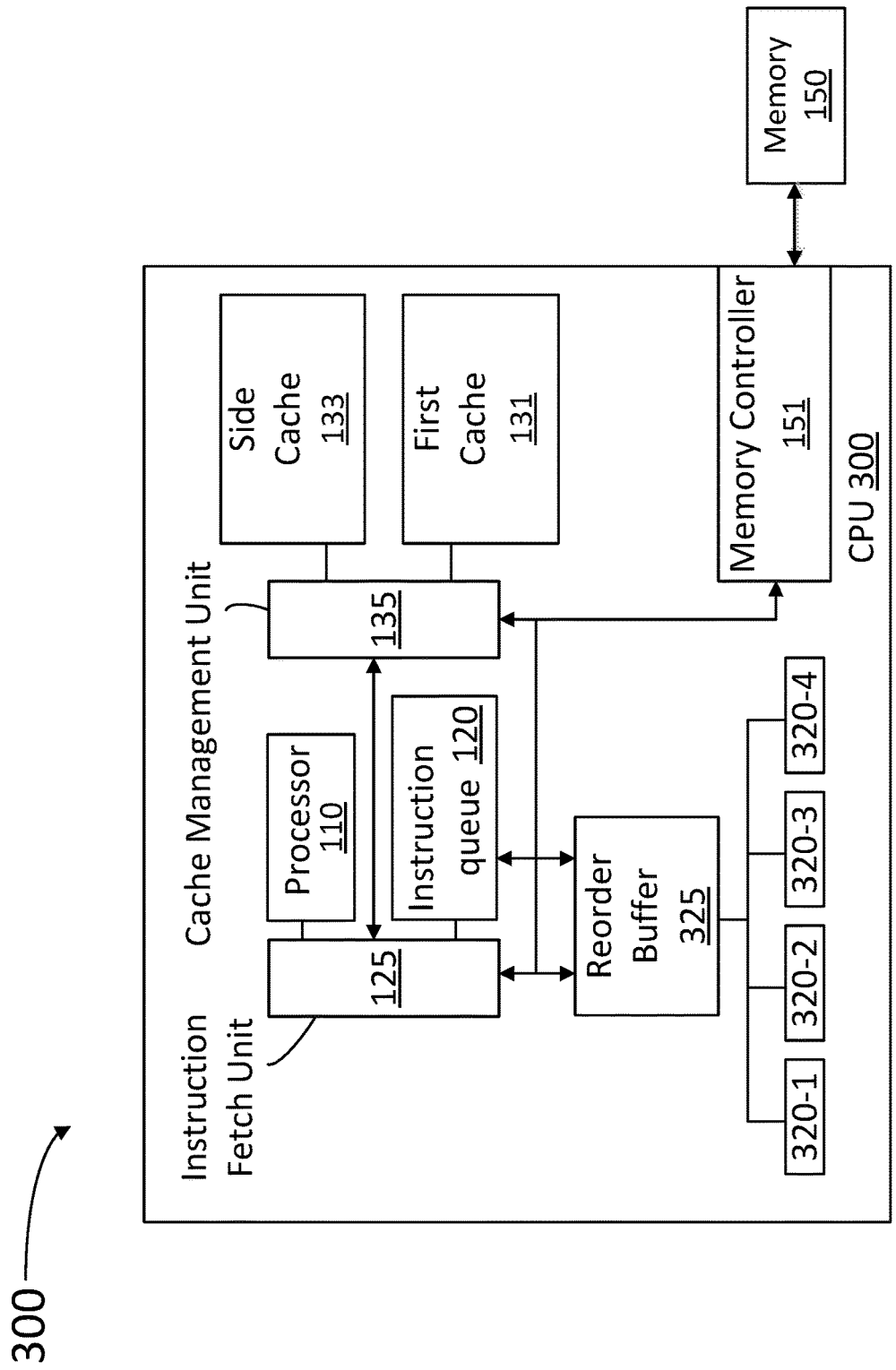
FIG. 3 illustrates an out-of-order execution in a central processing unit configured to reduce cache miss vulnerability, according to some embodiments.

FIG. 3 illustrates an out-of-order execution in a CPU 300 configured to reduce cache miss vulnerability, according to some embodiments. CPU 300 may include instruction fetch unit 125 to inform instruction queue 120 for processor 110 and a cache management unit 135 configured to control a cache 131 and a side cache 133 (c.f., CPU 100 in FIG. 1). CPU 300 may also include a reorder buffer 325 that splits instructions into minor execution units 320-1, 320-2, 320-3, and 320-4 (hereinafter, collectively referred to as "execution units 320"). Reorder buffer 325 is communicatively coupled with instruction fetch unit 125, instruction queue 120, and cache management unit 135, to incorporate the data accessed by execution units 320 either in cache 131 or in side cache 133, as appropriate. In some embodiments, reorder buffer 325 may be part of instruction queue 120. Memory 150 and memory controller 151 are also included in CPU 300 (cf. CPU 100).

An instruction triggering the speculative cache miss may not be the only instruction that needs data from a data line in cache 131. Subsequent data accesses check side cache 133 along with cache 131 to recognize when there is data in side cache 133 (or a pending cache miss has already been issued). In some embodiments, data may be forwarded from side cache 133 to the processor 110, after waiting a period of time. Accordingly, each entry in side cache 133 may further include a timestamp indicating when the entry was created. In the event of a second access request to the same data line in side cache 133, the data is not returned until a time equal to the difference between the first request and the second request, based on the timestamp. Cache management unit 135 may access the timestamp for other timeout periods used during cache management operations in cache 131 and side cache 133. This is to avoid the possibility of exploiting the vulnerability while speculatively triggered data accesses are still active in side cache 133. When multiple access requests are addressed to the same side cache line, some of the access requests may ultimately be abandoned, while others may retire. If any of the accesses reach retirement, the data line in side cache 133 associated with the speculative access is copied into cache 131 to avoid creating a new mechanism to access restricted data. Otherwise, malignant code could be created, whereby the absence of data that would normally have been moved into cache 131, but was discarded because of the initial speculative access to a full cache 131, was sufficient to reconstruct the protected data. To avoid this scenario, each data line in side cache 133 would further provide the capability to hold tags of each instruction that accessed its data while in the speculative buffer (e.g., tags 201). Accordingly, the speculative entry would be committed to cache 131 at the point that any one of these speculative transactions were retired, and the data line in side cache 133 would be discarded at the point that all the associated tags 201 were recognized as abandoned.

Figure 4:
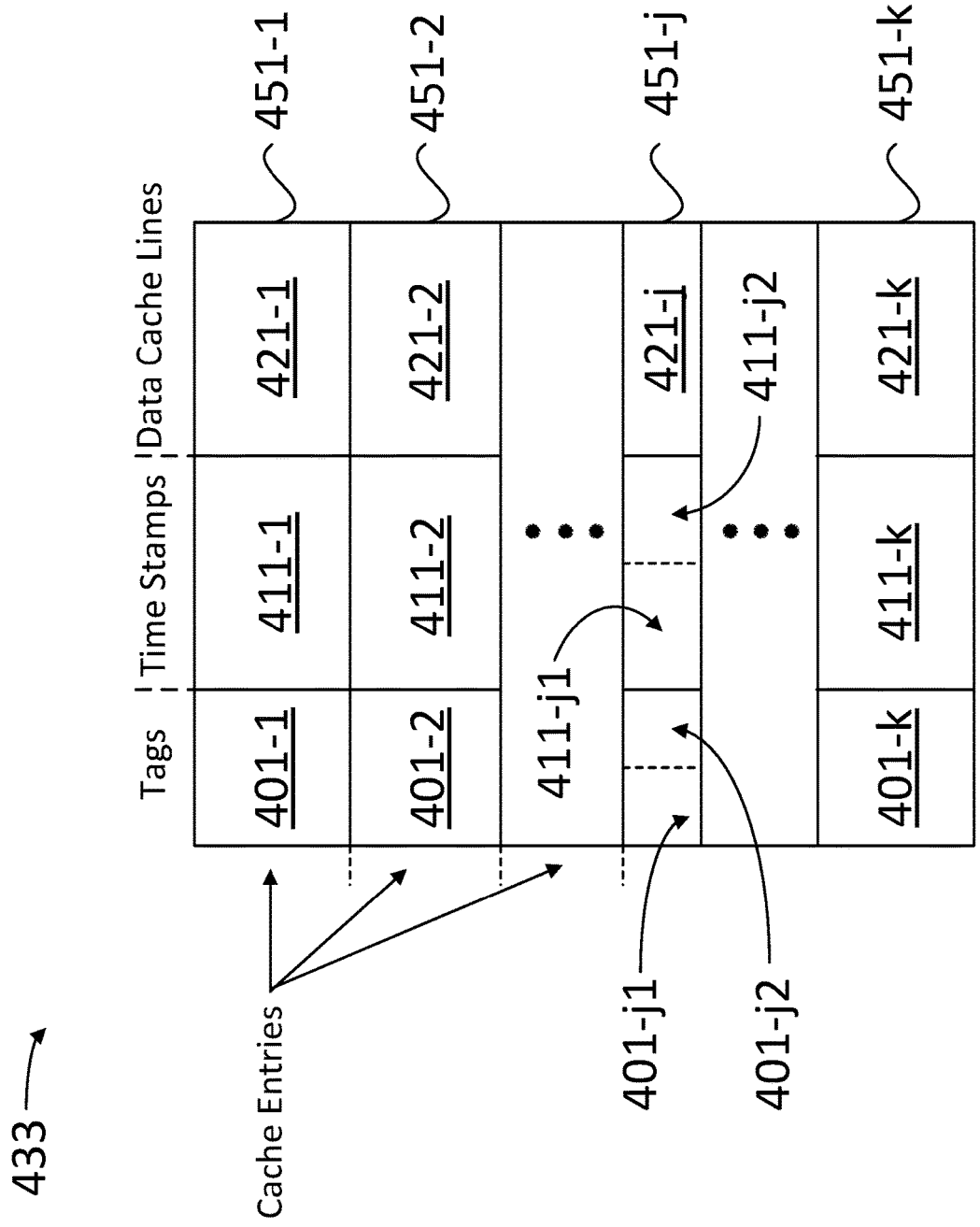
FIG. 4 illustrates a side cache including tag bits and time stamps to reduce cache miss vulnerability in a central processing unit, according to some embodiments.

FIG. 4 illustrates a side cache 433 (cf. side cache 133), including cache entries 451-1, 452-2, through 451-$j$ and 451-$k$ (hereinafter, collectively referred to as "cache entries 451," wherein 'j<k' are, in this embodiment, integer values larger than 2). Cache entry 451 include tag 401-1, 401-2, through 401-$j$ and 401-$k$ (hereinafter, collectively referred to as "tags 401"), and time stamps 411-1, 411-2, through 411-$k$ (hereinafter, collectively referred to as "time stamps 411"), respectively. In general, each tag may use multiple bits to hold the tag value. Tags 401 and time stamps 411 are associated with data cache lines 421-1 through 421-$j$ and 421-$k$ (hereinafter, collectively referred to as "data cache lines 421").

A cache line 451-$j$ in side cache 433 may include a data cache line 421-$j$ associated with multiple tags 401-$j_1$, 401-$j_2$ for each of multiple instructions (two, or more) that have accessed cache entry 451-$j$ before cache line 451-$j$ is transferred from side cache 433 to cache 131. Likewise, data cache line 421-$j$ may be associated with multiple timestamps 411-$j_1$ (the time at which instruction tagged 401-$j_1$ fetched data cache line 421-$j$) and 411-$j_2$ (the time at which instruction tagged 401-$j_2$ fetched data cache line 421-$j$). Tags 401 may be incremental, according to when the instructions were fetched. In some embodiments, the order in which these requests arrive at cache management unit 135 and into side cache 133 may be different than the order in which the instructions were fetched. Tags 401 and time stamps 411 may be provided with additional storage directly, or by implementation of a linked list structure to hold the necessary values (e.g., a pointer in cache entry 451-$j$ addressing a line in the link list that contains tags 401-$j_1$ and 401 $j_2$, and time stamps 411-$j_1$ and 411-$j_2$).

In some embodiments, cache management unit 135 is configured to determine, by looking at a tag bit 401-$j$, that the associated data cache line 421-$j$ is related to a speculative instruction that may be invalid. For example, tag 401-$j$ may be lower than a tag 401-$i$ for a previous instruction that accessed data cache line 421-$i$ and that has since been retired. In some embodiments, when at least one of the first instruction 401-$j_1$ or 401-$j_2$ is recognized as a retired instruction, cache management unit 135 may move cache line 421-$j$ from side cache into the first cache (e.g., first cache 131). If both tags 401-$j_1$ and 401-$j_2$ are recognized as abandoned instructions, then cache entry 451-$j$ is invalidated from side cache 433.

In some embodiments, processor 110 includes multiple processors sharing first cache 131 and side cache 433 (e.g., in a parallel computing configuration). Further, tag bits 401 in side cache 433 may include an extra bit or bits identifying a processor accessing the associated data cache line. In some embodiments, more than one additional bit may be used in tag 401 when more than two processors share the same cache (e.g., first cache 131 and side cache 133). Accordingly, cache management unit 135 may be able to determine the sequence of the instructions that accessed a data cache line 421-$j$, the time at which the request was made (or at which the portion was copied into side cache 433), and which processor, if multiple processors are active, made the request.

There is an additional mechanism to determine when one or multiple entries in side cache 433 should be abandoned: Processor 110 may indicate separately, to cache management unit 135, the tag 401 of the next access instruction candidate to retire. This instruction may ultimately be speculative if it is after a branch (e.g., instruction branches 220). Tags 401 can be used to invalidate speculative entries with a lower tag value. This avoids the situation wherein accesses that have remained speculative and abandoned for a long enough stretch overflows the available tag name space. Note that this in combination with the instruction fetch unit 125 stalling at the point that the tag name space is about to wrap around should be sufficient.

Figure 5:
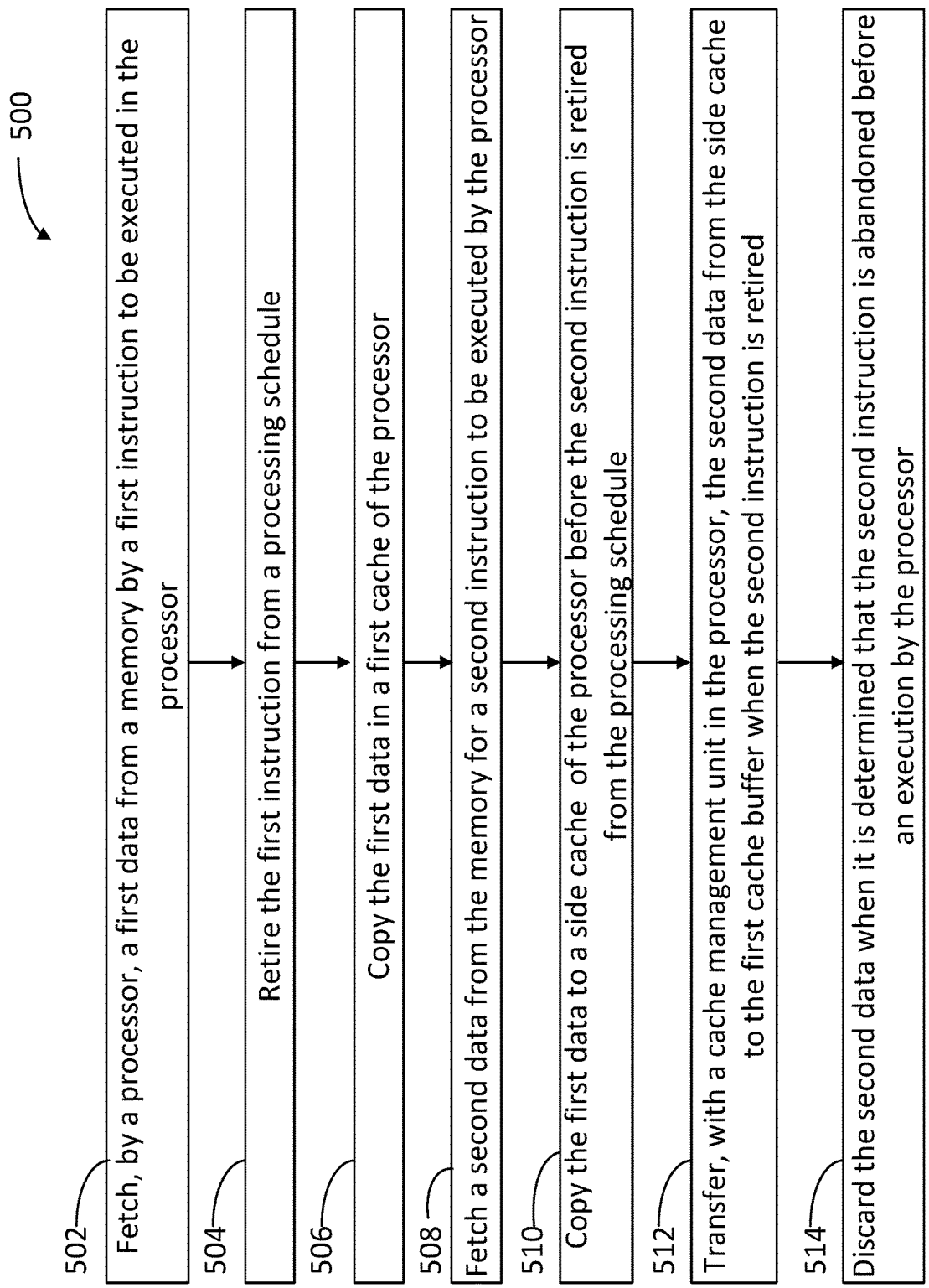
FIG. 5 illustrates a flow chart including steps in a method for reducing cache miss vulnerability in a central processing unit, according to some embodiments.

FIG. 5 illustrates a flow chart including steps in a method 500 for reducing a cache miss vulnerability in a central processing unit, according to some embodiments. At least one or more of the steps in method 500 may be performed by a central processing unit, including a processor, an instruction queue, a cache, a side cache, a cache management unit, and an instruction fetch unit, as disclosed herein (e.g., CPU 100, processor 110, instruction queue 120, cache 131, side caches 133 and 433, cache management unit 135, and instruction fetch unit 125). Methods consistent with the present disclosure may include at least one or more of the steps in method 500, performed in any order. For example, in some embodiments, a method may include one or more of the steps in method 500 performed overlapping in time, simultaneously, or quasi simultaneously.

Step 502 includes fetching, by a processor, a first data from a memory by a first instruction to be executed in the processor.

Step 504 includes retiring the first instruction from a processing schedule.

Step 506 includes copying the first data into a first cache of the processor.

Step 508 includes fetching a second data from the memory for a second instruction to be executed by the processor.

Step 510 includes copying the first data to a side cache of the processor before the second instruction is retired from the processing schedule.

Step 512 includes transferring, with a cache management unit in the processor, the second data from the side cache to the first cache when the second instruction is retired.

Step 514 includes discarding the second data when it is determined that the second instruction is abandoned before an execution by the processor. In some embodiments, step 514 further includes identifying, with the cache management unit, an access miss to the first data by a third instruction, and to provide the second data to the processor in response to the execution of the third instruction. In some embodiments, step 514 further includes evicting, with the cache management unit, a line in the first cache when the second instruction is scheduled for retirement. In some embodiments, step 514 further includes invalidating, with the cache management unit, an entry in the side cache that is associated with an instruction that was fetched prior to a retiring instruction.

Figure 6:
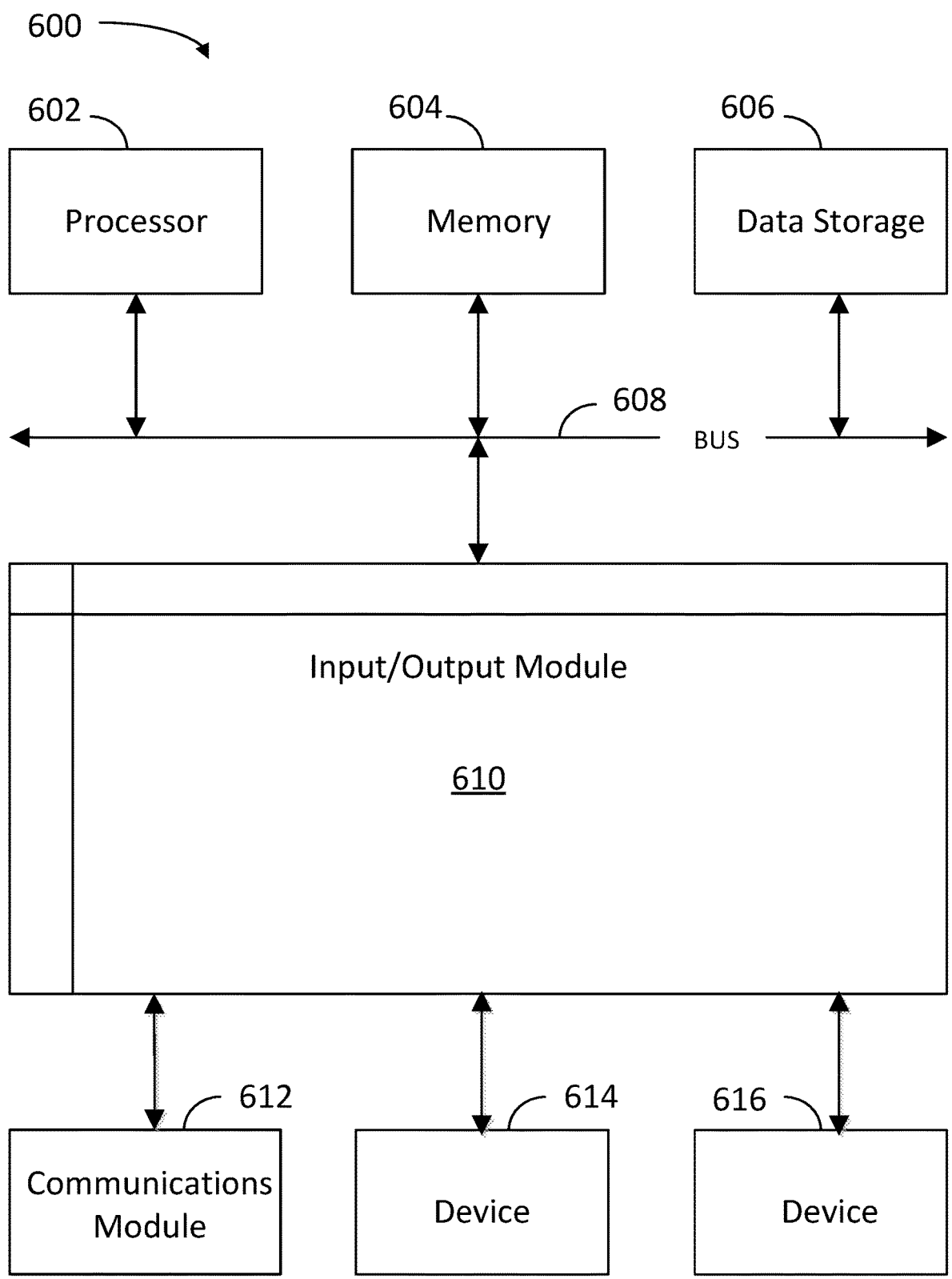
FIG. 6 is a block diagram illustrating an example computer system, including a central processing unit configured to reduce cache miss vulnerability, according to some embodiments.

FIG. 6 is a block diagram illustrating an example computer system 600, including a central processing unit configured to reduce cache miss vulnerability, according to some embodiments. In certain aspects, computer system 600 can be implemented using hardware or a combination of software and hardware, either in a dedicated server, integrated into another entity, or distributed across multiple entities. Moreover, in some embodiments, computer system 600 may be configured to perform at least some of the steps in method 500.

Computer system 600 includes a bus 608 or other communication mechanisms for communicating information, and a processor 602 coupled with bus 608 for processing information. By way of example, computer system 600 can be implemented with one or more processors 602. Processor 602 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 includes, in addition to hardware, code that creates an execution environment for the computer program in question, e.g., code that constitutes processor firmware, a protocol stack, a database management system, an operating system, or a combination of one or more of them stored in an included memory 604, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. Processor 602 and memory 604 can be supplemented by, or incorporated in, special purpose logic circuitry.

The instructions may be stored in memory 604 and implemented in one or more computer program products, i.e., one or more modules of computer program instructions encoded on a computer readable medium for execution by, or to control the operation of, the computer system 600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions.

Computer system 600 is coupled via input/output module 610 to various devices. The input/output module 610 is any input/output module. Example input/output modules 610 include data ports such as USB ports. The input/output module 610 is configured to connect to a communications module 612. Example communications modules 612 include networking interface cards, such as Ethernet cards and modems. In certain aspects, the input/output module 610 is configured to connect to a plurality of devices, such as an input device 614 and/or an output device 616. Example input devices 614 include a keyboard and a pointing device, e.g., a mouse or a trackball, by which a user can provide input to the computer system 600. Other kinds of input devices 614 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 616 include display devices, such as an LED (light emitting diode), CRT (cathode ray tube), or LCD (liquid crystal display) screen, for displaying information to the user.

Methods as disclosed herein may be performed by computer system 600 in response to processor 602 executing one or more sequences of one or more instructions contained in memory 604. Such instructions may be read into memory 604 from another machine-readable medium, such as data storage device 606. Execution of the sequences of instructions contained in main memory 604 causes processor 602 to perform the process steps described herein (e.g., as in method 500). One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 600 includes servers and personal computer devices. A personal computing device and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 602 for execution. Such a medium may take many forms, including, but not limited to, non-volatile media, volatile media, and transmission media. Non-volatile media include, for example, optical disks, magnetic disks, or flash memory, such as data storage device 606. Volatile media include dynamic memory, such as memory 604. Transmission media include coaxial cables, copper wire, and fiber optics, including the wires that comprise bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A device, comprising:
   a plurality of processors configured to access data to execute multiple instructions, the plurality of processors including a first processor and a second processor;
   a first cache coupled to the plurality of processors, the first cache configured to hold a first data fetched from a memory by a first instruction that has been retired;
   a side cache coupled to the first cache and to the plurality of processors, the side cache configured to hold a second data fetched from the memory by a second instruction, wherein the second instruction has not been retired from the second processor;
   a cache management unit configured to move the second data from the side cache to the first cache when the second instruction is retired from the second processor, the cache management unit further configured to discard the second data when it is determined that the second instruction is abandoned; and
   an instruction fetch unit configured to provide the first instruction and the second instruction to the first processor and the second processor, respectively, the instruction fetch unit further configured to associate a first tag with the first instruction and a second tag with the second instruction, wherein a first tag bit identifier corresponding to the first tag is different from a second tag bit identifier corresponding to the second tag, the first tag bit identifier including a first processor managed portion managed by the first processor and a first processor identifier portion that identifies the first processor and the second tag bit identifier including a second processor managed portion managed by the second processor and a second processor identifier portion that identifies the second processor, and wherein the first tag and the second tag address a same data line in at least one of the first cache or the side cache.

2. The device of claim 1, wherein the first processor managed portion is assigned according to a first sequence and the second processor managed portion is assigned according to a second sequence different from the first sequence.

3. The device of claim 1, wherein the first instruction and the second instruction comprise a memory access instruction that reads a data portion from, or writes the data portion to a memory coupled to the processor, and wherein the data portion comprises the first data and the second data.

4. The device of claim 1, wherein the first data or the second data is accessed by a third instruction executed by the processor.

5. The device of claim 1, wherein the cache management unit is configured to identify an access miss to the first data by a third instruction, and to provide the second data to the processor in response to an execution of the third instruction when the cache management unit identifies an access hit on the second data.

6. The device of claim 1, wherein the cache management unit is configured to evict a line in the first cache when the second instruction is retired.

7. The device of claim 1, wherein the cache management unit is configured to invalidate an entry in the side cache that is associated with an instruction that was fetched prior to the second instruction being retired.

8. The device of claim 1, wherein the cache management unit is configured to add a timestamp to the second data when the second data is entered in the side cache, and to provide the second data to a requesting third instruction after a period of time, based on the timestamp.

9. The device of claim 1, wherein the processor comprises multiple processors sharing the first cache and the side cache, and wherein the first tag corresponds to the first processor that executes the first instruction, and the second tag corresponds to the second processor that executes the second instruction.

10. The device of claim 1, wherein an entry for the second data in the side cache is configured to hold a respective tag for each of multiple instructions that have accessed the second data before the second data is retired or is transferred to the first cache.

11. The device of claim 1, wherein the side cache further comprises a link list structure to hold a third tag associated with a third instruction that accesses the second data before the second data is retired or is transferred to the first cache.

12. The device of claim 1, wherein the second instruction is a speculative instruction, and wherein the second tag indicates that that a third instruction executed prior to the second instruction and associated with a third tag having a lower tag value than a tag value of the second tag bit identifier is invalid.

13. A system, comprising:
a memory configured to store data; and
a central processing unit coupled to the memory, the central processing unit comprising:
  a plurality of processors configured to access data to execute multiple memory access instructions, the plurality of processors including a first processor and a second processor;
  a first cache coupled to the plurality of processors, the first cache configured to hold a first data copied into the first cache from the memory by a first memory access instruction that has been retired;
  a side cache coupled to the first cache and to the plurality of processors, the side cache configured to hold a second data copied into the side cache from the memory by a second memory access instruction, wherein the second memory access instruction has not been retired from the second processor;
  a cache management unit configured to move the second data from the side cache to the first cache when the second memory access instruction is retired from the second processor, the cache management unit further configured to discard the second data when it is determined that the second memory access instruction is abandoned; and
  an instruction fetch unit configured to provide the first instruction and the second instruction to the first processor and the second processor, respectively, the instruction fetch unit further configured to associate a first tag with the first instruction and a second tag with the second instruction, wherein a first tag bit identifier corresponding to the first tag is different from a second tag bit identifier corresponding to the second tag, the first tag bit identifier including a first processor managed portion managed by the first processor and a first processor identifier portion that identifies the first processor and the second tag bit identifier including a second processor managed portion managed by the second processor and a second processor identifier portion that identifies the second processor, and wherein the first tag and the second tag address a same data line in at least one of the first cache or the side cache.

14. The system of claim 13, wherein the first tag identifier comprises a first tag value managed by the processor that is sequentially lower than a second tag value of the second tag identifier.

15. The system of claim 13, wherein the cache management unit is configured to identify an access miss to the first data by a third memory access instruction, and to provide the second data to the processor in response to an execution of the third memory access instruction when the cache management unit identifies an access hit on the second data.

16. The system of claim 13, wherein the cache management unit is configured to add a timestamp to the second data when the second data is entered in the side cache, and to provide the second data to a third memory access instruction after a period of time, based on the timestamp.

17. A method, comprising:
fetching, by a first processor of a plurality of processors, a first data from a memory for a first instruction to be executed by the first processor;
retiring the first instruction from a processing schedule;
copying the first data in a first cache of the plurality of processors;
fetching a second data from the memory for a second instruction to be executed by a second processor of the plurality of processors;
copying the first data to a side cache of the plurality of processors before the second instruction is retired from the processing schedule;
transferring, with a cache management unit the second data from the side cache to the first cache when the second instruction is retired;
discarding the second data when it is determined that the second instruction is abandoned before an execution by the second processor;
fetching the first instruction and the second instruction to the first processor and the second processor, respectively; and
associating a first tag with the first instruction and a second tag with the second instruction, wherein a first tag bit identifier corresponding to the first tag is different from a second tag bit identifier corresponding to the second tag, the first tag bit identifier including a first processor managed portion managed by the first processor and a first processor identifier portion that identifies the first processor and the second tag bit identifier including a second processor managed portion managed by the second processor and a second processor identifier portion that identifies the second processor, and wherein the first tag and the second tag address a same data line in at least one of the first cache or the side cache.

18. The method of claim 17, further comprising evicting, with the cache management unit, a line in the first cache when the second instruction is retired.

19. The method of claim 17, further comprising invalidating, with the cache management unit, an entry in the side cache that is associated with an instruction that was fetched prior to the second instruction being retired.

20. The method of claim 17, wherein the first processor that is processor managed portion is sequentially lower than the second processor managed portion despite the first instructions being issued prior to the second instruction.

* * * * *